(12) United States Patent
Ghasemi et al.

(10) Patent No.: US 11,964,230 B2
(45) Date of Patent: Apr. 23, 2024

(54) MATERIALS, SYSTEMS, AND METHODS FOR CO2 CAPTURE AND CONVERSION

(71) Applicant: University of Houston System, Houston, TX (US)

(72) Inventors: Hadi Ghasemi, Woodlands, TX (US); Varun Kashyap, Houston, TX (US); T. Randall Lee, Houston, TX (US); Riddhiman Medhi, Houston, TX (US)

(73) Assignee: University of Houston System, Houston, TX (US)

( * ) Notice: Subject to any disclaimer, the term of this patent is extended or adjusted under 35 U.S.C. 154(b) by 0 days.

(21) Appl. No.: 17/961,139

(22) Filed: Oct. 6, 2022

(65) Prior Publication Data

US 2023/0050422 A1    Feb. 16, 2023

Related U.S. Application Data

(62) Division of application No. 16/959,484, filed as application No. PCT/US2019/016049 on Jan. 31, 2019, now Pat. No. 11,541,349.

(60) Provisional application No. 62/624,333, filed on Jan. 31, 2018.

(51) Int. Cl.
*B01D 53/14*    (2006.01)
*B01D 53/00*    (2006.01)

(52) U.S. Cl.
CPC ....... *B01D 53/1475* (2013.01); *B01D 53/005* (2013.01); *B01D 53/1406* (2013.01); *B01D 53/1418* (2013.01); *B01D 2252/10* (2013.01); *B01D 2257/504* (2013.01)

(58) Field of Classification Search
CPC .............. B01D 53/1475; B01D 53/005; B01D 53/1406; B01D 53/1418; B01D 2252/10; B01D 2257/504
USPC ........................................................ 423/230
See application file for complete search history.

(56) References Cited

U.S. PATENT DOCUMENTS

| 2008/0087165 A1 | 4/2008 | Wright et al. |
| 2011/0014100 A1 | 1/2011 | Bara et al. |
| 2014/0251786 A1 | 9/2014 | Landry et al. |

FOREIGN PATENT DOCUMENTS

| CN | 103349859 A | 10/2013 | |
| CN | 107442044 A | * 12/2017 | .......... B01J 13/0091 |
| WO | 2013132259 A1 | 9/2013 | |

OTHER PUBLICATIONS

CN-107442044-A English translation (Year: 2017).*
Zhu et al., "Phosphonium-based Ionic Liquids Grafted onto Silica for CO2 Sorption", Theoretical Foundations of Chemical Engineering, vol. 48, No. 6, 2014, pp. 787-792. (Year: 2014).*

(Continued)

*Primary Examiner* — Anita Nassiri-Motlagh
(74) *Attorney, Agent, or Firm* — Carter, DeLuca & Farrell LLP; George Likourezos

(57) ABSTRACT

A system configured to capture $CO_2$ and able to be washed of the captured $CO_2$ includes a material including an ionic liquid configured to capture $CO_2$ in response to exposure to a gas comprising $CO_2$ and to a thermal energy source and an aerogel holding the ionic liquid therein. The system may also include a washing solution configured to wash the captured $CO_2$ from the material.

20 Claims, 8 Drawing Sheets

(56) References Cited

OTHER PUBLICATIONS

Xin et al., "Adsorption and diffusivity of CO2 in phosphonium ionic liquid modified silica", Chemical Engineering Journal 246 (2014) 79-87. (Year: 2014).*
Valderrama, "Melting properties of molten salts an ionic liquids. Chemical homology, correlation, and prediction", C.R. Chimie 19 (2016) 654-664. (Year: 2016).*
Han et al., "Carbon Dioxide Capture Using Calcium Hydroxide Aqueous Solution as the Absorbent", Energy & Fuels 25 (8), pp. 3825-3833, Jul. 2011, 13 pages.
International Search Report and Written Opinion issued in corresponding International Application No. PCT/US2019/016049 dated Apr. 15, 2019, 9 pages.
International Preliminary Report on Patentability for application No. PCT/US2019/016049 dated Aug. 13, 2020.

* cited by examiner

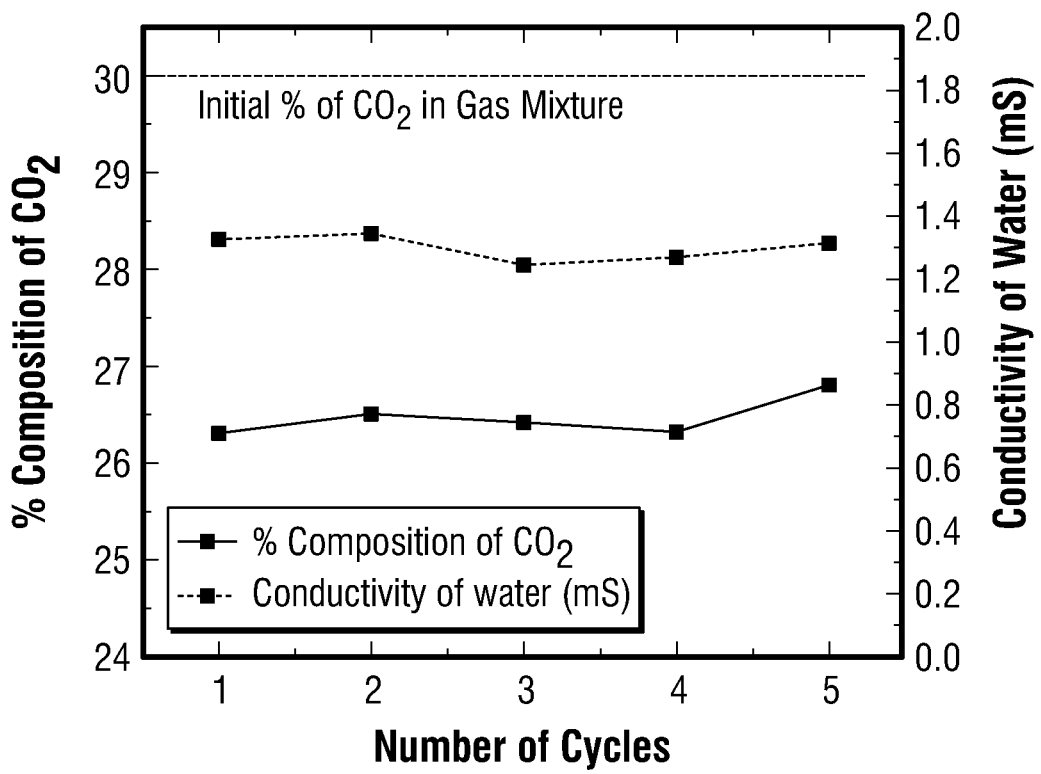
FIG. 7
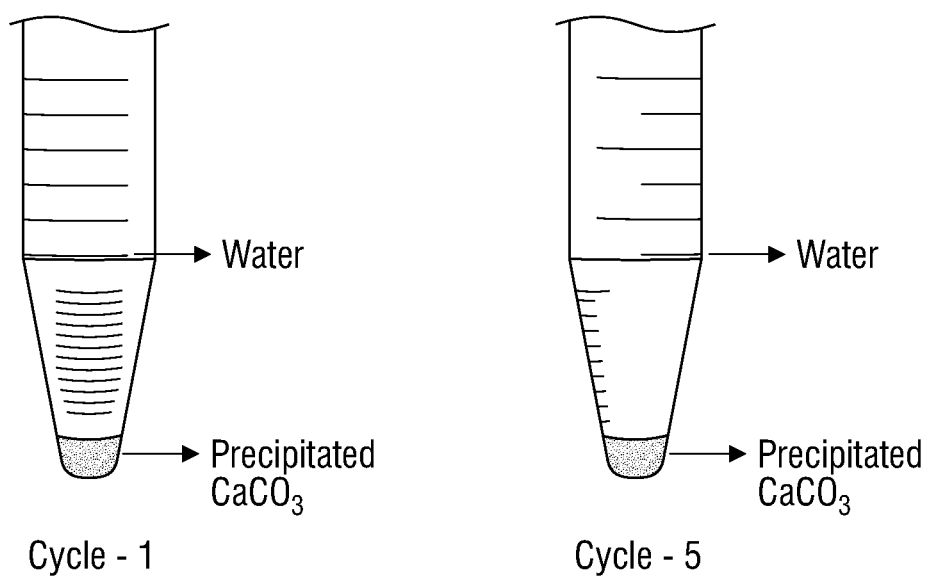
FIG. 8A  FIG. 8B

MATERIALS, SYSTEMS, AND METHODS FOR CO2 CAPTURE AND CONVERSION

CROSS-REFERENCE TO RELATED APPLICATIONS

This application is a divisional application of U.S. patent application Ser. No. 16/959,484, filed on Jul. 1, 2020, which is a 371 National Stage Application of International Application No. PCT/US2019/016049, filed on Jan. 31, 2019, which claims the benefit of and priority to U.S. Provisional Patent Application No. 62/624,333, filed on Jan. 31, 2018, the entire contents of each of which is hereby incorporated herein by reference.

BACKGROUND

Technical Field

The present disclosure relates to $CO_2$ reduction and, more specifically, to materials, systems, and methods for $CO_2$ capture and conversion into useful byproducts.

Background of Related Art

Since the industrial revolution, $CO_2$ emissions have increased dramatically due largely to the transportation, building, and industrial sectors and the corresponding exponential increase in the usage of fossil fuels. In fact, $CO_2$ emissions have increased at the alarming rate of approximately 40% globally over the last 10 to 15 years, and this number is expected to double by 2050.

Due to the massive increase in $CO_2$ emissions, one of the major areas of emphasis on the global energy market is the reduction of greenhouse gases, specifically $CO_2$. The capture of $CO_2$ is viewed as one of the most prominent means of decarburization. Several studies have been published that describe the importance of $CO_2$ capture and strategies to cut emissions by half in the US. With an increasing demand for this domain of research, a variety of mechanisms are being explored for effective $CO_2$ capture.

Currently, commercial systems and methods employed for $CO_2$ capture include amine-based solvents, mainly monoethanolamine (MEA), diethanolamine, and methyldienthanolamine. However, the limited capacity for the capture of $CO_2$, toxicity of the resultant chemicals, loss of reagent due to evaporation, equipment corrosion, and large enthalpy of reaction corresponding to higher energy requirements considerably reduces the efficiency of these current systems and methods.

It would therefore be desirable to provide reusable materials, systems, and methods capable of effectively and efficiently capturing $CO_2$ and converting the captured $CO_2$ into useful byproducts in a cyclic, repeatable manner.

SUMMARY

The present disclosure provides effective and efficient materials, systems, and methods for $CO_2$ capture and conversion into useful byproducts. More specifically, the present disclosure provides stable, sustainable, cyclically repeatable $CO_2$ collection materials, systems, and methods activated by solar heat localization. These materials, systems, and methods utilize ionic liquids and a graphene aerogel, which undergoes solid-liquid phase change to efficiently capture $CO_2$ at a rate of 0.2 moles of $CO_2$ for every mole of ionic liquid and converts the absorbed $CO_2$ into useful byproducts, e.g., water and calcium carbonate, in each cycle. These and other aspects and features of the present disclosure are detailed below. To the extent consistent, any of the aspects and features detailed herein may be used in conjunction with any or all of the other aspects and features detailed herein.

Provided in accordance with aspects of the present disclosure is a method of capturing $CO_2$ and converting the captured $CO_2$ into useful byproducts. The method includes providing a material including a material matrix holding an ionic liquid, exposing the material to a source of thermal energy (e.g., employing solar heat localization) to capture $CO_2$ within the material, removing the material from exposure to the source of thermal energy, and washing the material with a solution to convert the captured $CO_2$ and wash the converted, captured $CO_2$ from the material as filtrate.

In aspects of the present disclosure, the method further includes separating the filtrate into at least one useful byproduct. Separating the filtrate into at least one useful byproduct may be accomplished, in aspects, by allowing the filtrate to sit for a period of time or treating the filtrate with additional solution.

In aspects of the present disclosure, the filtrate is separated into byproducts including $H_2O$ and/or $CaCO_3$.

In aspects of the present disclosure, the solution is an aqueous $Ca(OH)_2$ solution.

In aspects of the present disclosure, the method further includes cyclically repeating, a plurality of additional times: exposing the material to the source of thermal energy to capture $CO_2$ within the material, removing the material from exposure to the source of thermal energy, and washing the material with the solution to convert the captured $CO_2$ and wash the converted, captured $CO_2$ from the material as filtrate.

In aspects of the present disclosure, exposing the material to the source of thermal energy includes exposing the material to solar illumination.

A material provided in accordance with the present disclosure and configured to capture $CO_2$ and able to be washed of the captured $CO_2$ includes an ionic liquid, e.g., a commercially-available ionic liquid or a fluorinated ionic liquid, having a melting point of from 30° C. to 70° C., and a material matrix. The ionic liquid is configured to capture $CO_2$ in response to exposure to a thermal energy source. The material matrix is permeable and porous, hydrophobic, and oleophilic and is configured to hold the ionic liquid therein.

In aspects of the present disclosure, the material matrix is an aerogel and, more specifically, in aspects, a graphene aerogel.

In aspects of the present disclosure, the ionic liquid is the commercially-available ionic liquid C10MI·$BF_4$ or C16MI·$Tf_2N$, or the fluorinated ionic liquid $CF_3(CF_2)_7(CH_2)_3MI][(CF_3$—$CF_2SO_2)_2N$.

In aspects of the present disclosure, the ionic liquid is washable to wash out $CO_2$ captured therein.

A system provided in accordance with the present disclosure and configured to capture $CO_2$ and convert the captured $CO_2$ into useful byproducts includes a $CO_2$ absorber including an ionic liquid and a material matrix, and a washing solution. The ionic liquid has a melting point of from 30° C. to 70° C. and is configured to capture $CO_2$ in response to exposure to a thermal, e.g., solar, energy source. The material matrix is permeable and porous, hydrophobic, and oleophilic, and is configured to hold the ionic liquid therein. The washing solution is configured to wash captured $CO_2$ from the $CO_2$ absorber and convert it into useful byproducts.

In aspects of the present disclosure, the material matrix includes a graphene aerogel.

In aspects of the present disclosure, the ionic liquid is fluorinated.

In aspects of the present disclosure, the solution is an aqueous $Ca(OH)_2$ solution.

BRIEF DESCRIPTION OF THE DRAWINGS

Various aspects and features of the present disclosure are described hereinbelow with reference to the drawings wherein like numerals designate similar elements in each of the several views and:

FIG. 7 is a graph of results from an experiment utilizing the materials and methods of the present disclosure, illustrating repeatability over a plurality of cycles; and FIG. 8A is a side view of a test tube including precipitated $CaCO_3$ and water byproducts of an experiment utilizing the materials and methods of the present disclosure, after a first cycle; and FIG. 8B is a side view of a test tube including precipitated $CaCO_3$ and water byproducts of the experiment of FIG. 8A, after a fifth cycle.

DETAILED DESCRIPTION

Referring to FIGS. 1A-1D and 2, provided in accordance with the present disclosure is a material, referred to herein as a Reusable Carbon Dioxide ($CO_2$) Absorber (RCA), configured to capture $CO_2$ and convert the captured $CO_2$ into useful byproducts such as, for example, precipitated calcium carbonate ($CaCO_3$) and water ($H_2O$). $CaCO_3$ is useful for many purposes including water treatment and the manufacture of paints, plastics, papers, sealants, adhesives, inks, cement, plaster, mortars, pharmaceuticals, and nutritional supplements, to name a few. For the purposes herein, the term "useful byproduct" refers to any byproduct that is non-toxic and is itself utilized in a generally-accepted manner in the industry or field for which it pertains and/or utilized in a process (e.g., a treatment process, a manufacturing process, etc.) that is generally-accepted in the industry or field for which it pertains. Systems and methods for capturing $CO_2$ and converting the captured $CO_2$ into useful byproducts are also provided in accordance with the present disclosure.

With initial reference to FIG. 1A and step S210 of FIG. 2, RCA 100, described in greater detailed below, includes a material matrix holding an ionic liquid. RCA 100 may be incorporated into a suitable system (not explicitly shown) to facilitate $CO_2$ capture under solar illumination, or via another thermal energy source 110. Such a system may include, for example, a chamber retaining RCA 100 therein, a cover covering the chamber and configured for efficient transmission of solar irradiation therethrough, and an input and output defined into and out of the chamber, respectively. Any suitable system, including large-scale systems, may be utilized and are within the scope of the present disclosure.

Figure 1A:
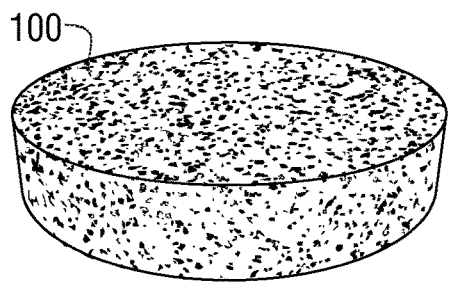
FIG. 1A is a schematic diagram illustrating a material provided in accordance with the present disclosure for $CO_2$ capture and conversion.
Figure 1B:
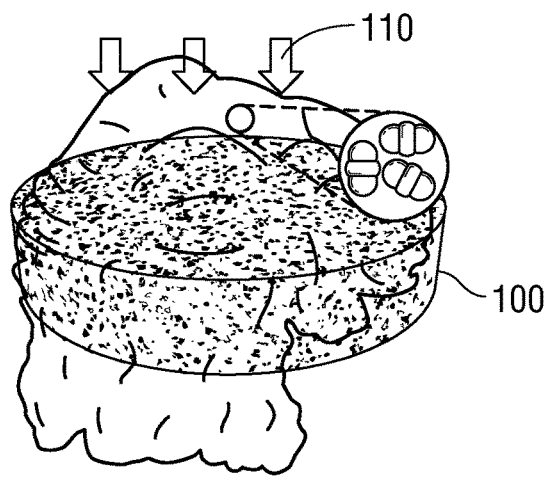
FIG. 1B is a schematic diagram illustrating the material of FIG. 1A being exposed to solar energy and capturing $CO_2$.
Figure 2:
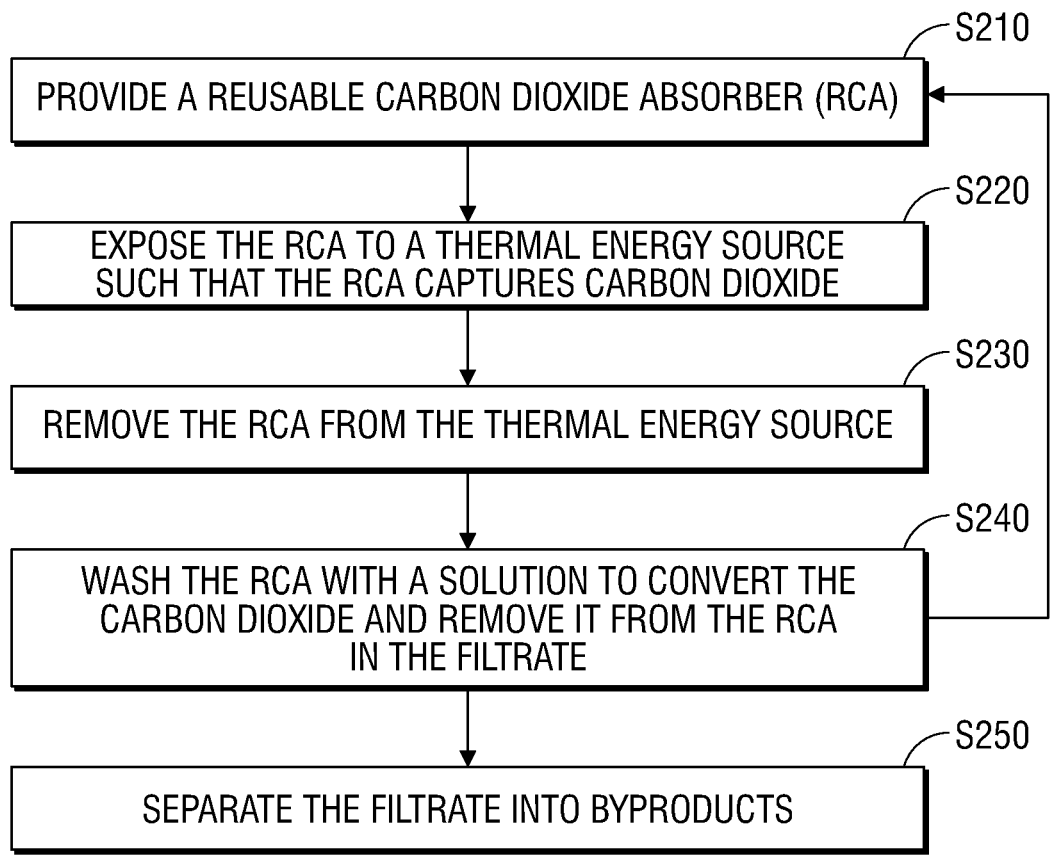
FIG. 2 is a flow diagram illustrating a method of $CO_2$ capture and conversion provided in accordance with the present disclosure.

Referring also to FIG. 1B and step S220 of FIG. 2, when RCA 100 is exposed to a thermal energy source 110 such as, for example, solar illumination, heat localization simulates a phase change of the ionic liquid of RCA 100 from the solid state to the liquid state to facilitate the capture of $CO_2$ gas in the RCA 100 due the fact that absorption of $CO_2$ by an ionic liquid is greater in the liquid state of the ionic liquid than in the solid state of the ionic liquid.

As indicated in step S230 of FIG. 2, after sufficient $CO_2$ capture, RCA 100 is removed from exposure to thermal energy source 110 (FIG. 1B). Thereafter, with reference to FIG. 1C and step S240 of FIG. 2, RCA 100 is washed with a solution 120, e.g., an aqueous calcium hydroxide (Ca$(OH)_2$) solution, that serves to convert the captured $CO_2$ and remove the converted $CO_2$ from RCA 100 as filtrate from the wash. The filtrate includes the byproducts 130 of the $CO_2$ capture and washing from RCA 100, as detailed below.

More specifically, with reference to FIG. 1C and step S240 of FIG. 2, the physical and chemical reactions involved in the washing of the $CO_2$ captured RCA 100 with solution 120 are described and represented below in equations (1), (2), (1)+(2), and (3). As will be appreciated in view of the following, this enables the reuse of RCA 100 for multiple cycles of $CO_2$ capture and conversion into useful byproducts 130, e.g., $CaCO_3$ and $H_2O$.

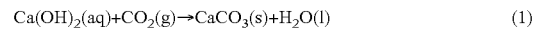

$$Ca(OH)_2(aq)+CO_2(g) \rightarrow CaCO_3(s)+H_2O(l) \quad (1)$$

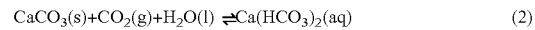

$$CaCO_3(s)+CO_2(g)+H_2O(l) \rightleftharpoons Ca(HCO_3)_2(aq) \quad (2)$$

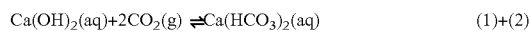
(1)+(2)

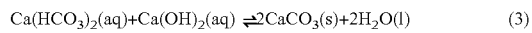
(3)

Since ionic liquids strongly adsorb $CO_2$, successful washing of $CO_2$ from the ionic liquid of RCA 100 requires a solution 120 that binds $CO_2$ more strongly than the ionic liquid of RCA 100. Once such solution 120 is aqueous $Ca(OH)_2$.

The reaction of $Ca(OH)_2$ with $CO_2$ to form calcium carbonate and calcium bicarbonate, provided in equations (1), (2), and (1)+(2) above, is well known. $Ca(OH)_2$ primarily produces $CaCO_3$, as indicated in equation (1) above, but forms $Ca(HCO_3)_2$ in the presence of excess $CO_2$, as indicated in equation (2), above.

The use of a solution 120 having a low concentration of $Ca(OH)_2$ in combination with an excess of $CO_2$ selectively forms the soluble $Ca(HCO_3)_2$ species that can be washed from RCA 100. The absorption of $CO_2$ into a $Ca(OH)_2$ solution 120 is more efficient if the concentration of $Ca(OH)_2$ is low. Indeed, previous studies have shown that lower concentrations of $Ca(OH)_2$ lead to most of the $CO_2$ absorbed in the solution to form a mixture of soluble ions, mainly bicarbonate. As such, a low concentration of $Ca(OH)_2$ in solution 120, e.g., a 0.01 M $Ca(OH)_2$ solution, to wash the $CO_2$ from RCA 100 may thus be utilized.

Figure 1C:
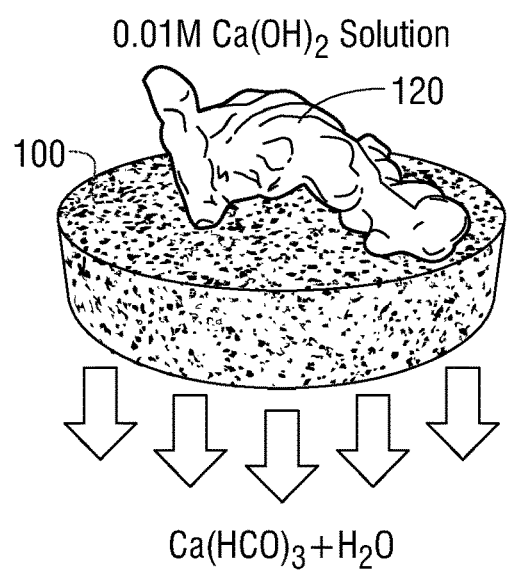
FIG. 1C is a schematic diagram of the material of FIG. 1A after it has captured $CO_2$ via exposure to solar energy, illustrating the material being washed to convert and remove the $CO_2$ from the material.

RCA 100, having been washed as detailed above, may then be re-used to capture additional $CO_2$, convert the captured $CO_2$, and wash the converted $CO_2$ from RCA 100 as filtrate, similarly as detailed above and illustrated in FIGS. 1A-1C and steps S210-S240 of FIG. 2.

Figure 1D:
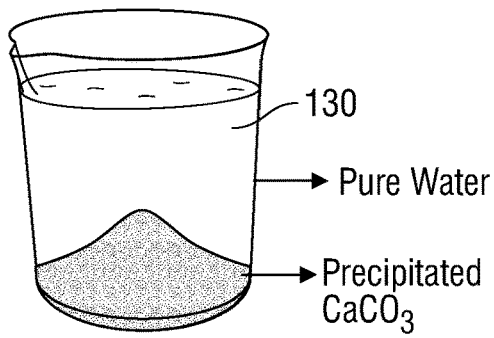
FIG. 1D is a schematic diagram illustrating the byproducts of the $CO_2$ capture and conversion illustrated in FIGS. 1A-1C.

Referring to FIG. 1D and step S250 of FIG. 2, byproducts 130 obtained from the filtrate resulting from the washing of the $CO_2$-captured RCA 100 are separated. Separation of the filtrate into $CaCO_3$ and $H_2O$ byproducts 130 may be accomplished, for example, by allowing the filtrate to sit for a suitable time, e.g., 5 days, until the excess $CO_2$ escapes from the filtrate leaving the precipitated $CaCO_3$ and $H_2O$ behind, or may be facilitated by treating the filtrate with additional aqueous $Ca(OH)_2$ solution to precipitate out the calcium as $CaCO_3$, leaving $CaCO_3$ and $H_2O$. Via either method, or other suitable method, the result is an output of $CaCO_3$ and $H_2O$, wherein the number of moles of $H_2O$ formed is equal to the number of moles of $CO_2$ absorbed. As noted above, $CaCO_3$ has many uses such as in water treatment and in the manufacture of many different products across many different industries. The usefulness and important of water needs no elaboration.

With general reference to FIGS. 1A-1D, RCA 100, as mentioned above, includes a material matrix holding an ionic liquid. Exemplary material matrices and ionic liquids forming RCA 100 are detailed below, although other suitable material matrices and ionic liquids forming RCA 100 are also contemplated and within the scope of the present disclosure. The ionic liquid for RCA 100 is selected to have a melting point range between 30° C. and 70° C. such that, when RCA 100 is exposed to solar thermal energy source 110, the thermal energy simulates a phase change in the ionic liquid from the solid state to the liquid state via heat localization, and such that the ionic liquid remains in the solid state in the absence of exposure to thermal energy source 110. Such a configuration is advantageous due the fact that absorption of $CO_2$ by an ionic liquid is greater in the liquid state of the ionic liquid than in the solid state of the ionic liquid, as noted above. Further, a melting point range between 30° C. and 70° C. also facilitates solar illumination at 1 sun and integration of the ionic liquid into the material matrix to form RCA 100.

With respect to exemplary ionic liquids suitable for use in forming RCA 100, it is noted that, while most $CO_2$ absorption studies with ionic liquids have been performed using ionic liquids with methyl imidazolium-based cations coupled with a host of other anions, it has been found that fluorinated anions are significantly better in $CO_2$ absorption compared to other anions, with the $CO_2$ absorption capability increasing with an increasing degree of fluorination. High molecular weight of the cation also increases $CO_2$ absorption. In addition, to avoid loss of the ionic liquid in the washing step (see FIG. 1C and step S240 in FIG. 2) using the aqueous $Ca(OH)_2$ solution, the ionic liquid should be largely immiscible in water. Miscibility of an ionic liquid in water depends on the water-ion interaction strength and the size of the ions (larger ions are less miscible). The magnitude of the localized charge in the connecting atom also plays a role in miscibility. Two exemplary, commercially-available ionic liquids meeting the above-detailed criteria are C10MI·$BF_4$ and C16MI·$Tf_2N$.

In addition to commercially available ionic liquids, fluorinated ionic liquids may also be utilized such as, for example, the fluorinated imidazolium ionic liquid [$CF_3$($CF_2$)$_7$($CH_2$)$_3$MI][($CF_3$—$CF_2SO_2$)$_2$N], abbreviated as FIL. This ionic liquid has a melting point of 56° C. and is a suitable ionic liquid for use in RCA 100 given that it will melt within the working temperatures detailed above and, being a long-chain fluorinated system, would produce good $CO_2$ absorption. While this fluorinated ionic liquid is one example, other long-chain fluorinated methyl-imidazolium ionic liquids may also be utilized in RCA 100.

Continuing with general reference to FIGS. 1A-1D, the material matrix of RCA 100 is selected to hold the ionic liquid and enable heat localization using a thermal energy source such as solar energy. More specifically, the material matrix is selected to include: (1) high absorption in the solar spectrum, (2) low thermal conductivity for localizing thermal energy, (3) high permeability and porosity to hold a large volume of the ionic liquid, (4) hydrophobicity to avoid the retention of water in the material matrix, and (5) oleophilicity to absorb and retain the ionic liquid in the material matrix. Two-dimensional graphene, for example, meets the above-noted criteria and, in particular, possesses high mechanical strength, low density, permeability and porosity, hydrophobicity and oleophilicity. Thus, graphene aerogels are suitable candidates for the material matrix of RCA 100 to hold the ionic liquid of RCA 100.

One particular graphene aerogel and method of manufacturing the same is detailed below, although other suitable graphene aerogels, other material matrices, and/or methods of manufacturing are also contemplated and within the scope of the present disclosure. First, 100 mg of L-phenylalanine is dissolved in 5 mL of distilled water. Once dissolved, 5 mL of graphene oxide is added to the solution, and the solution is poured into a 25 mL vial for sonication for 10 minutes. After sonication, the vial is placed in a hot oil bath at 95° C. for 48 hours to afford a wet hydrogel. The hydrogel is then freeze dried for 48 hours at −65° C. to obtain the graphene aerogel.

Figure 3:
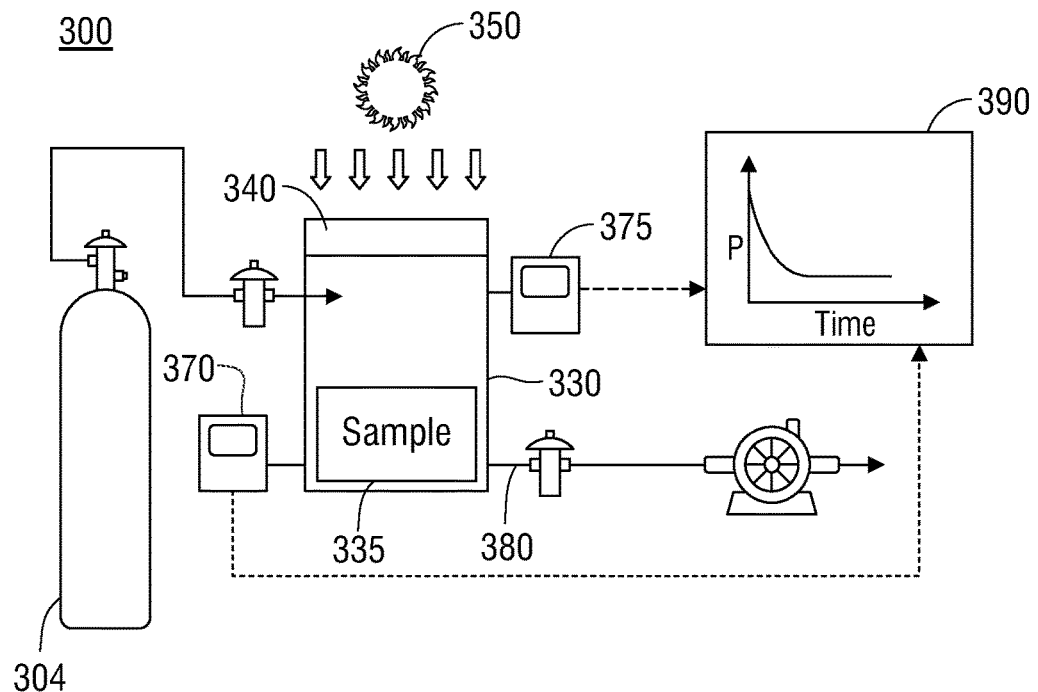
FIGS. 3 and 4 are schematic illustrations of experimental setups configured to measure the absorption of $CO_2$ utilizing the materials and methods of the present disclosure.

With reference to FIG. 3, in conjunction with FIGS. 1A-1D, an experimental system 300 for evaluating $CO_2$ capture, e.g., the amount of $CO_2$ absorbed in RCA 100, with solar illumination is illustrated and described below. System 300 includes a $CO_2$ cylinder 304 containing $CO_2$ gas; an absorption chamber 330; a sample holder 335, e.g., an acrylic sample holder, disposed within the absorption chamber 330 and including the "SAMPLE," i.e., RCA 100; a fiber glass window 340 enabling solar illumination from solar illuminator 350 to pass therethrough into absorption chamber 330; a gas output 380; a temperature sensor 370; a pressure sensor 375, e.g., a pressure transducer; and a computer 390 for data acquisition and analysis. Absorption chamber 330 includes an input for receiving $CO_2$ gas $CO_2$ cylinder 304 and an output for outputting resultant gas to gas output 380.

In the experiments using system 300, the "SAMPLE" was positioned within sample holder 335 within absorption chamber 330 and solar illuminator 350 activated until the temperature within absorption chamber 330, measured via temperature sensor 370, e.g., a thermocouple, reached a constant value above the melting point of the ionic liquid to be tested. The pressure in absorption chamber 330 was monitored using pressure sensor 375. Outputs of temperature sensor 370 and pressure sensor 375 were connected to computer 390, and the generated data was collected by a suitable program, e.g., a LabView® program, available from National Instruments of Austin, Texas, USA. The pressure within absorption chamber 330 was maintained between 2 bar and 6 bar and the temperature within absorption chamber 330 was maintained at 25° C. for approximately 40 minutes during each experiment. The amount of $CO_2$ captured (in terms of mole fraction) was calculated using the observed drop in pressure using the ideal gas equation.

Figure 4:
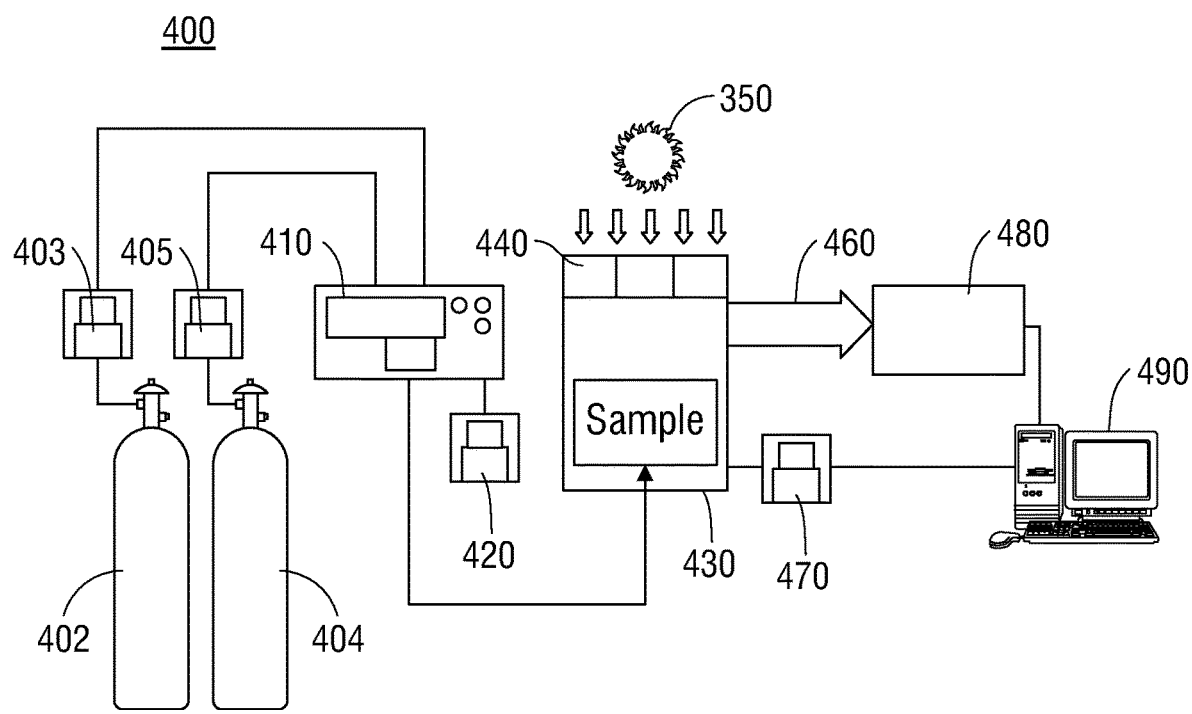

Turning to FIG. 4, in conjunction with FIGS. 1A-1D, another experimental system 400 for evaluating the amount of $CO_2$ absorbed in RCA 100 is illustrated and is described below. System 400 includes an $N_2$ cylinder 402 containing $N_2$ gas, a $CO_2$ cylinder 404 containing $CO_2$ gas, mass flow controllers 403, 405 for the $N_2$ cylinder 402 and $CO_2$ cylinder 404, respectively, a gas mixer 410, a temperature controller 420, an absorption chamber 430 including the "SAMPLE," i.e., RCA 100, a fiber glass window 440 enabling solar illumination from solar illuminator 450 to pass therethrough into absorption chamber 430, a gas output 460, a temperature sensor 470, an output gas analyzer 480, and a computer 490 for data acquisition and analysis.

In the experiments, to evaluate the amount of $CO_2$ absorbed in RCA 100, a known mass and mixture of $N_2$ and $CO_2$ gas was prepared from $N_2$ cylinder 402 and $CO_2$ cylinder 404 utilizing mass flow controllers 403, 405, and gas mixer 410, and was passed into absorption chamber 430 (containing RCA 100) at a known pressure. The temperature of the mixture was controlled using temperature controller 420. Solar irradiation of 1 kWm$^{-2}$ from solar illuminator 450 was applied to RCA 100 within absorption chamber 430, through fiber glass window 440, to simulate phase change of the ionic liquid in RCA 100. The output gas received from gas output 460 was then analyzed using gas analyzer 480 and computer 490. The temperature of the output gas was also monitored using temperature sensor 470 to evaluate phase change of the ionic liquid in RCA 100. Utilizing the above experimental system 400 and knowing the initial mass flow of the gases and the difference between the initial percentage of $CO_2$ and the final percentage of $CO_2$ after capture, the amount of $CO_2$ absorbed by RCA 100 was readily determined. Of course, other suitable experimental systems may also be utilized.

With reference to FIGS. 5A-5D, experimental results from different experiments of $CO_2$ capture in accordance with the materials and methods of the present disclosure are illustrated for various ionic liquids as the ionic liquid of RCA 100 (FIG. 1A) and two-dimensional graphene as the material matrix of RCA 100 (FIG. 1A).

Figure 5A:
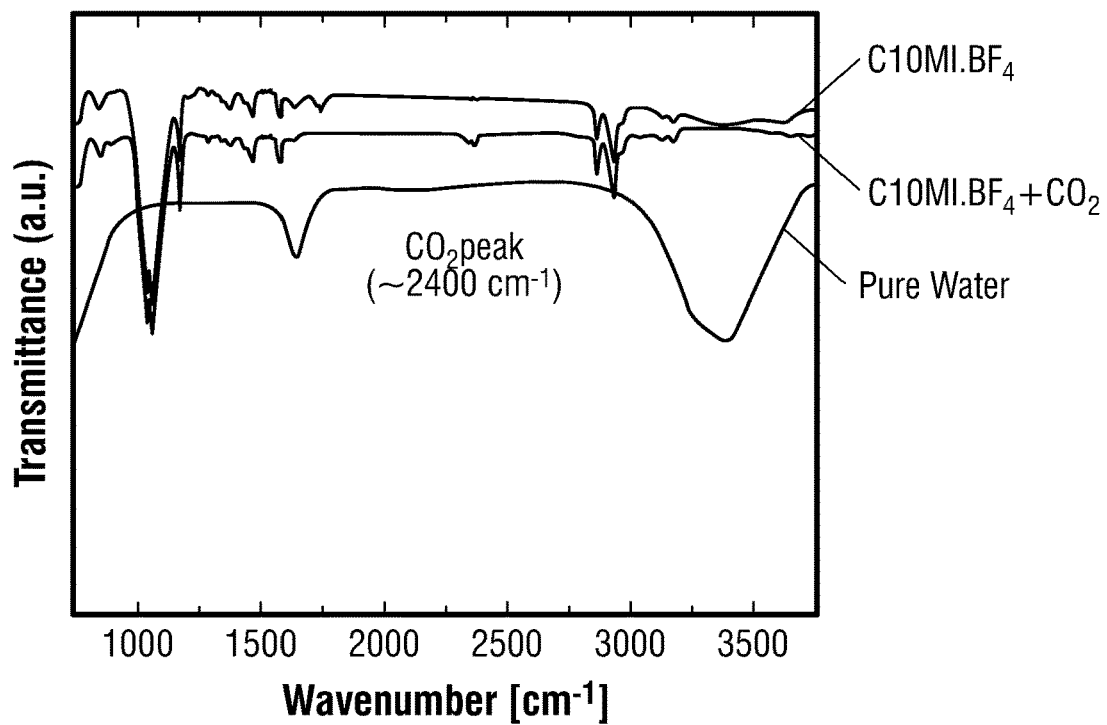
FIG. 5A is a graph of results from an experiment utilizing the materials and methods of the present disclosure, with CM10MI·$BF_4$ as the ionic liquid, illustrating Fourier-Transform Infrared (FTIR) spectra for the capture of $CO_2$.
Figure 5B:
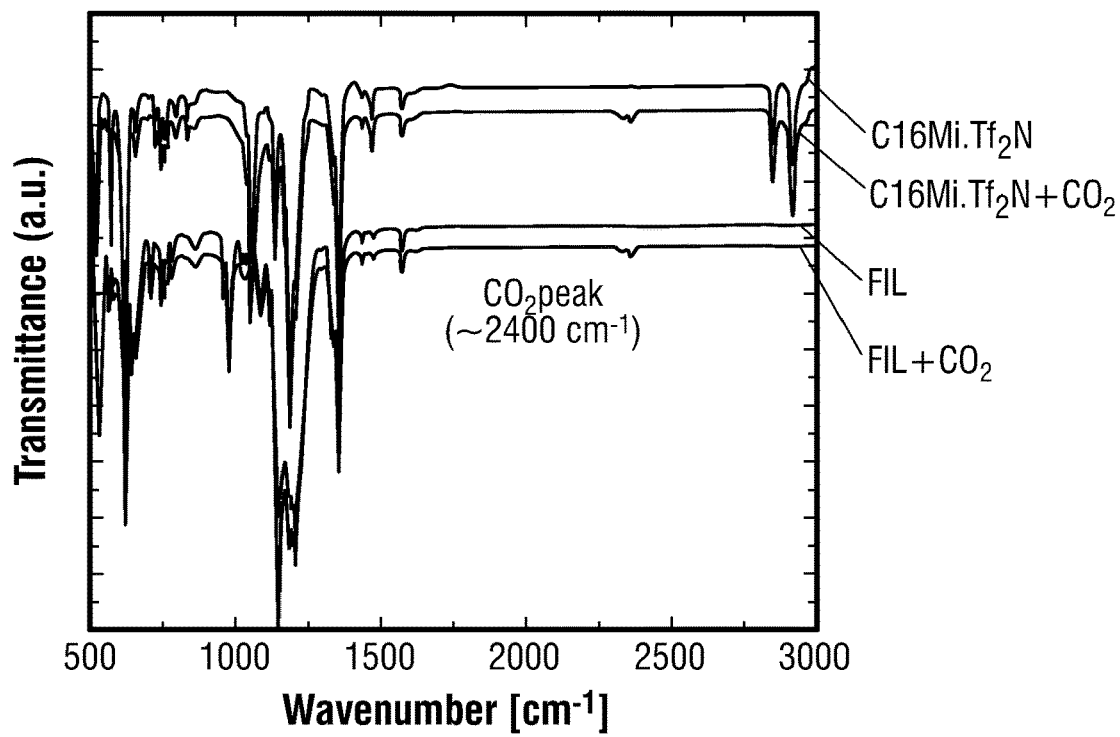
FIG. 5B is a graph of results from an experiment utilizing the materials and methods of the present disclosure, with C16MI·$Tf_2N$ and a fluorinated ionic liquid (FIL) as the ionic liquids, illustrating FTIR spectra for the capture of $CO_2$.

FIGS. 5A and 5B, more specifically, illustrate Fourier-Transform Infrared (FTIR) spectra for the capture of $CO_2$ using C10MI·BF$_4$ as the ionic liquid (FIG. 5A), C16MI·Tf$_2$N as the ionic liquid (FIG. 5B), and a fluorinated ionic liquid (FIL) as the ionic liquid (FIG. 5B).

As illustrated in FIGS. 5A and 5B, the FTIR spectra for the above-noted ionic liquids after $CO_2$ absorption indicate a clear peak for $CO_2$ at 2400 cm$^{-1}$, in accordance with earlier reports of $CO_2$ FTIR measurements. To confirm that the peaks were not due to atmospheric $CO_2$, IR measurements were conducted after purging the compartment with nitrogen gas to remove atmospheric $CO_2$. The IR spectrum of pure water was also obtained, as illustrated in FIG. 5A. Multiple trials consistently revealed a $CO_2$ peak for the ionic liquid samples only, verifying the capture of $CO_2$. No changes were observed in the base ionic liquid patterns, thereby indicating that the $CO_2$ was absorbed in the ionic liquids via physisorption. Experimental setups similar to the ones detailed above (see FIGS. 3 and 4) were also used to quantify $CO_2$ capture in the RCA 100 (FIG. 1A) with the above-noted ionic liquids.

Figure 5C:
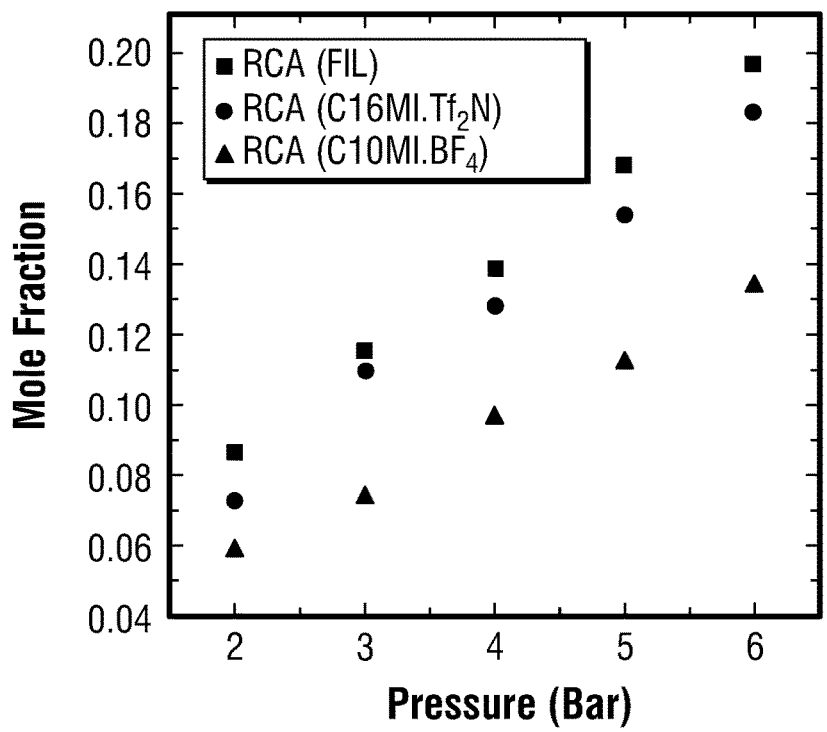
FIG. 5C is a graph of results from a pressure drop experiment utilizing the materials and methods of the present disclosure, illustrating $CO_2$ capture in terms of mole fraction.

FIG. 5C illustrates the results of pressure drop experiments conducted to quantify the $CO_2$ capture of the above-noted ionic liquids in terms of mole fraction. FIG. 5C, more specifically, shows the mole fraction of captured $CO_2$ as a function of pressure. These experiments were conducted for RCA 100 (FIG. 1A) containing above-noted ionic liquids (C16MI·Tf$_2$N, C10MI·BF$_4$, and FIL). Solar irradiation of one sun was incident on the sample to stimulate solid-liquid phase change. As shown, the captured $CO_2$ in RCA 100 (FIG. 1A) using FIL as the ionic liquid is slightly higher than that using C16MI·Tf$_2$N as the ionic liquid, likely due to the higher degree of fluorination in FIL.

Figure 5D:
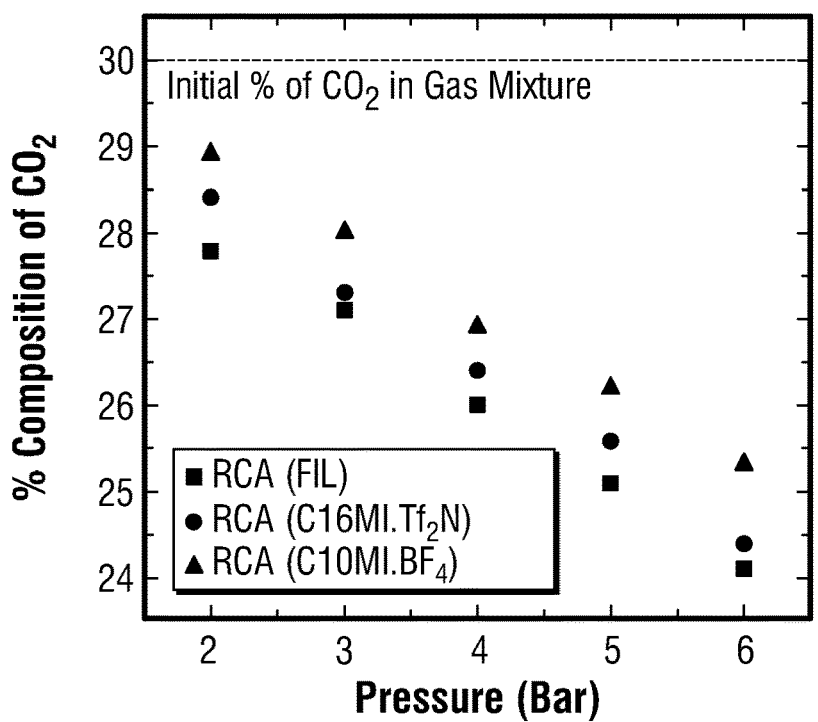
FIG. 5D is a graph of results from a pressure drop experiment utilizing the materials and methods of the present disclosure, illustrating $CO_2$ capture in terms of a change in percentage of $CO_2$.

FIG. 5D shows the percentage drop of $CO_2$ as a function of pressure for RCA 100 (FIG. 1A) with C16MI·Tf$_2$N as the ionic liquid, RCA 100 (FIG. 1A) with C10MI·BF$_4$ as the ionic liquid, and RCA 100 (FIG. 1A) with FIL as the ionic liquid. As shown in FIG. 5D, the maximum drop in percentage of $CO_2$ in the gas mixture is observed for the RCA 100 (FIG. 1A) with FIL as the ionic liquid. This trend is consistent with the mole fraction of captured $CO_2$ for these ionic liquids. Further, these results confirm the absorption selectivity for $CO_2$ over $N_2$. Therefore, the selective capture of $CO_2$ in RCA 100 (FIG. 1A) is confirmed from these experiments.

Figure 6A:
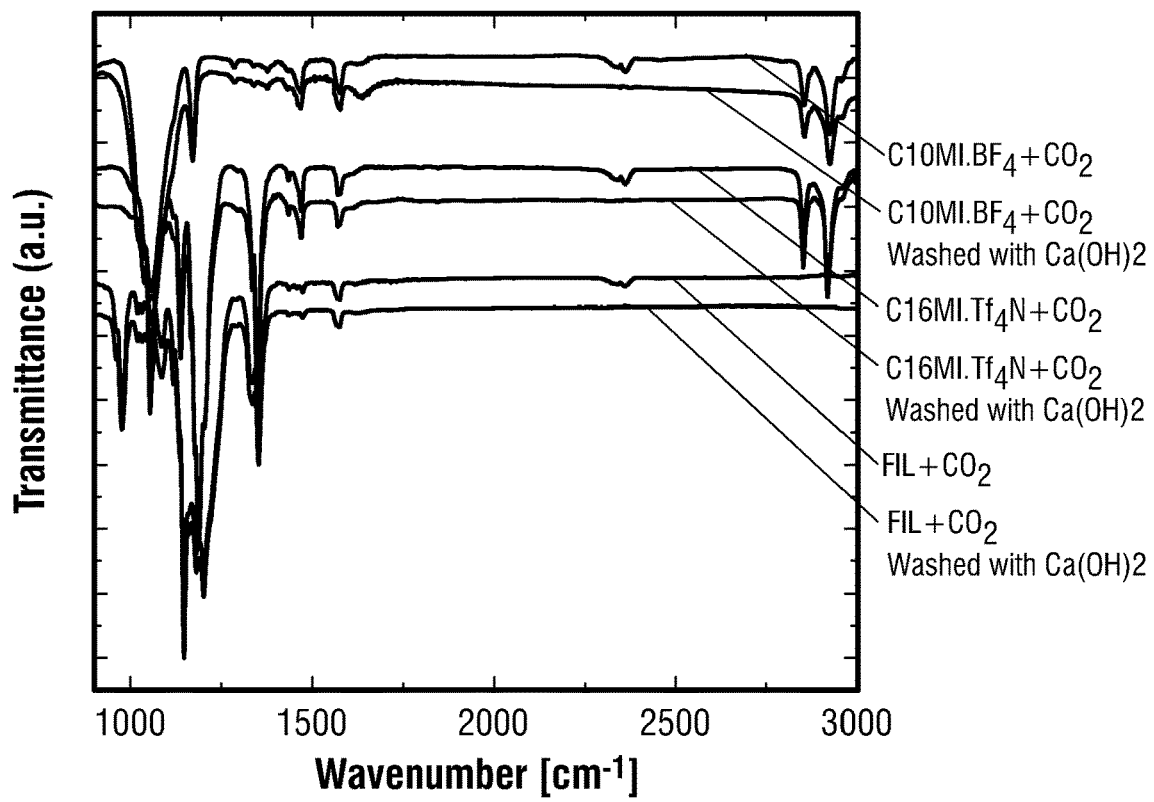
FIG. 6A is a graph of results from an experiment utilizing the materials and methods of the present disclosure, illustrating FTIR spectra to verify $CO_2$ presence before and after washing with $Ca(OH)_2$.

FIG. 6A illustrates experimental results, in the form of FTIR spectra, of the $CO_2$ captured ionic liquid of RCA 100 (FIG. 1A) and the ionic liquid of RCA 100 (FIG. 1A) after washing with solution 120 (aqueous 0.01M Ca(OH)$_2$ solution; FIG. 1C) to obtain precipitated CaCO$_3$, for each of the above-noted ionic liquids. As illustrated, the disappearance of the $CO_2$ peak at ~2400 cm$^{-1}$ after washing the ionic liquids with the Ca(OH)$_2$ solution confirms the effectiveness of the washing process.

Figure 6B:
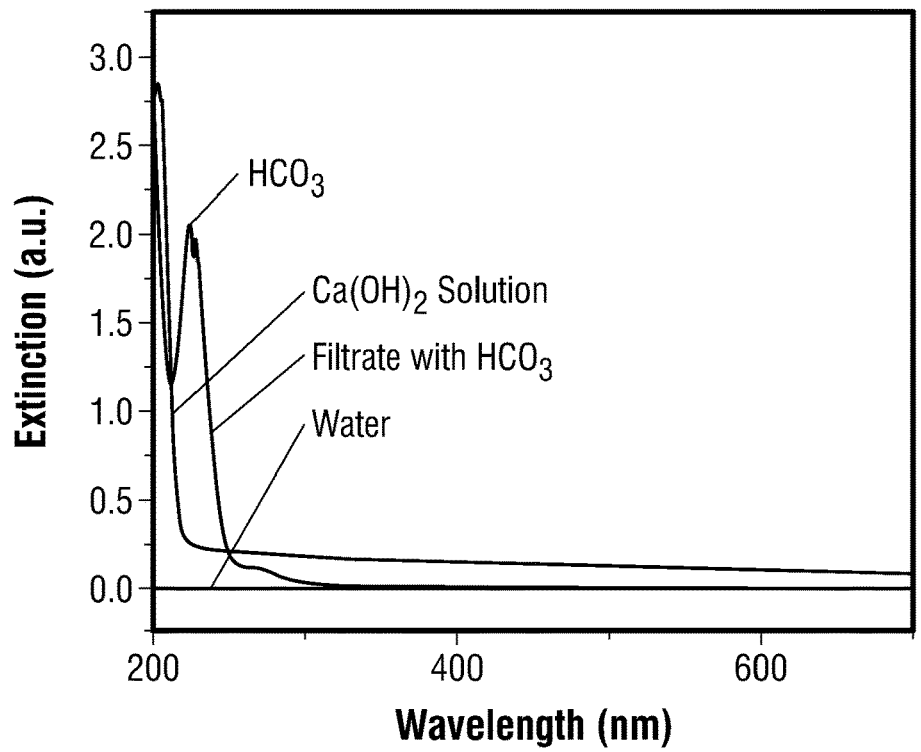
FIG. 6B is a graph of results from an experiment utilizing the materials and methods of the present disclosure, illustrating a Ultraviolet-visible (UV-vis) spectrum for the $Ca(OH)_2$ solution used for washing and the filtrate formed after washing (verifying information of $Ca(HCO_3)_2$)

The absorption of $CO_2$ into a Ca(OH)$_2$ solution is more efficient if the concentration of Ca(OH)$_2$ is low. This is because lower concentrations of Ca(OH)$_2$ lead to $CO_2$ absorbed in the solution, forming a mixture of mainly soluble bicarbonate ions. 0.01 M Ca(OH)$_2$ solution was used to wash the $CO_2$ out of RCA 100 (FIG. 1A) with FIL as the ionic liquid. FIL, being mostly immiscible in water, remains unchanged, while the $CO_2$ is converted to the soluble HCO$_3^-$ species and is collected in the filtrate. Conversion of the $CO_2$ to soluble HCO$_3^-$ is confirmed by its presence in the filtrate via Ultraviolet-visible (UV-Vis) spectroscopy, as shown in FIG. 6B. Note that the UV-Vis spectrum was obtained soon after the RCA 100 (FIG. 1A) was washed with the Ca(OH)$_2$ solution. From these observations, the presence of Ca(HCO$_3$)$_2$ in the filtrate can be confirmed, implying effective washing of the RCA 100 (FIG. 1A) and conversion of the absorbed CO$_2$.

Figure 6C:
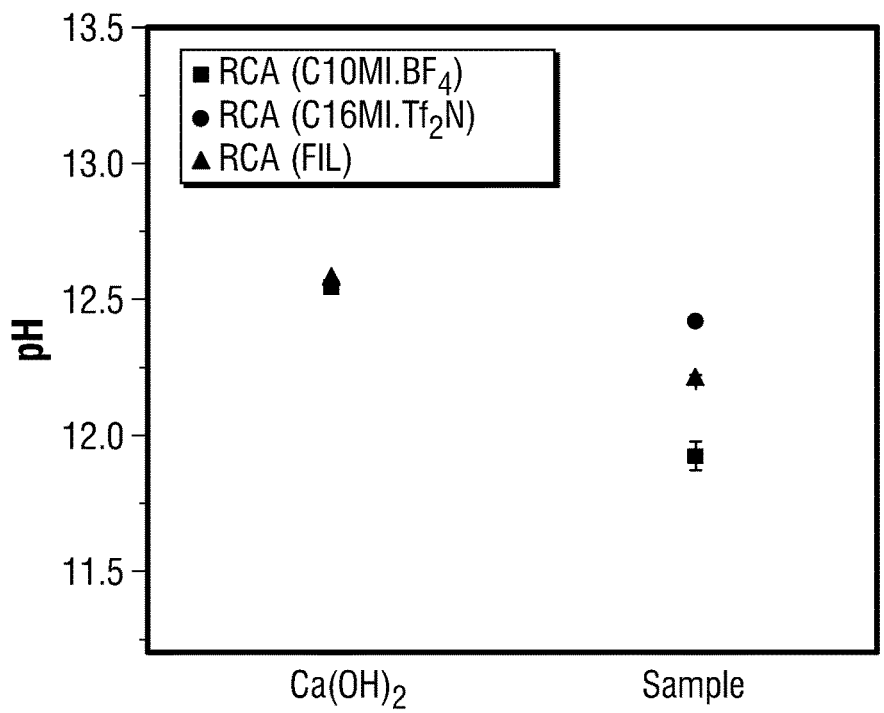
FIG. 6C is a graph of results from an experiment utilizing the materials and methods of the present disclosure, illustrating pH measurements to verify formation of $Ca(HCO_3)_2$ in the filtrate upon washing with $Ca(OH)_2$.
Figure 6D:
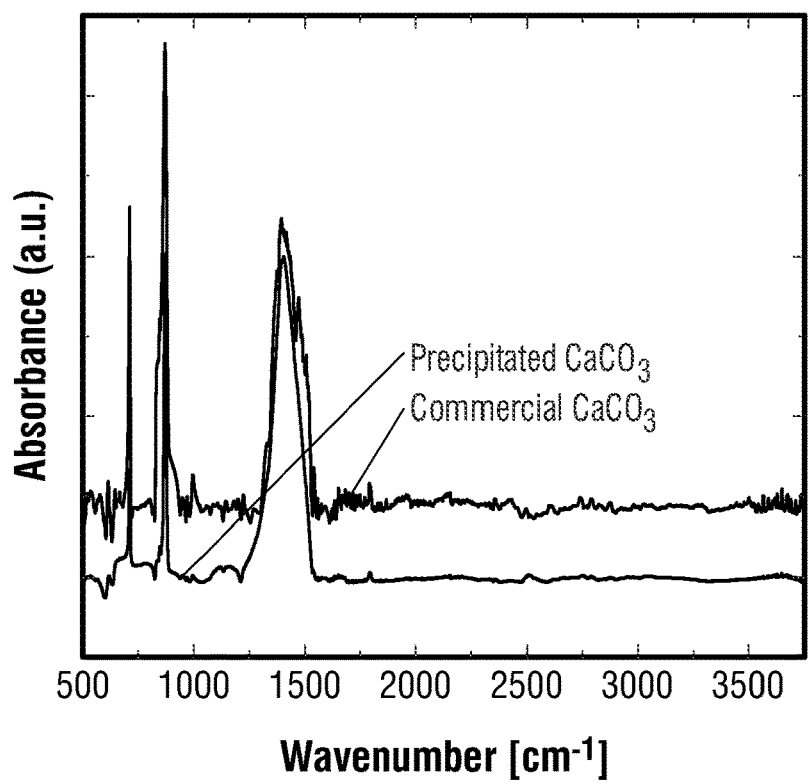
FIG. 6D is a graph of results from an experiment utilizing the materials and methods of the present disclosure, illustrating FTIR spectra for the final precipitated $CaCO_3$ and comparison with commercially available $CaCO_3$.

An electronic pH meter with a measuring probe (not shown) was used to compare the pH levels between the calcium hydroxide solution before and after washing the CO$_2$-impregnated RCA 100 (FIG. 1A), for each of the ionic liquids noted above (C10MI·BF$_4$, C16MI·Tf$_2$N, and FIL) for three trials to confirm the reproducibility of the results. A drop in pH was observed in the filtrate compared to the starting Ca(OH)$_2$ solution used for washing the ionic liquids, as shown in FIG. 6C. This experiment thus implicates the consumption of OH$^-$ to form the less basic HCO$_3^-$ species in solution, responsible for the drop in pH. Soluble HCO$_3$" is benign, but it is not the most commercially useful form of carbonate species. A conversion to a more useful product is thus desirable. Precipitated CaCO$_3$ enjoys widespread use in a variety of industries, including paints, plastics, papers, and sealants. Therefore, to precipitate CaCO$_3$ from Ca(HCO$_3$)$_2$ solution, the solution was left to stand. Once the excess CO$_2$ escapes from the solution, precipitated CaCO$_3$ is left behind, which was verified by the FTIR spectrum shown in FIG. 6D. The spectrum shows pure CaCO$_3$ as compared to a reference spectrum of commercial CaCO$_3$.

FIG. 7 illustrates experimental results testing for repeatability over a plurality, e.g., five, cycles, wherein FIL is used as the ionic liquid of RCA 100 (FIG. 1A) and the final percentage composition of CO$_2$ is measured after each cycle. Although FIG. 7 illustrates the results from repeated CO$_2$ absorption and washing over multiple cycles using RCA 100 (FIG. 1A) with FIL used as the ionic liquid, similar results would apply to the other ionic liquids detailed above. In these results, a nearly constant drop in the percentage of CO$_2$ was observed in the gas mixture over multiple trials, thereby confirming the repeatability of RCA 100 (FIG. 1A).

Continuing with reference to FIG. 7, more specifically, the gas analyzer setup and protocol detailed above was used to evaluate the reusability of RCA 100 (FIG. 1A) to yield the plot of percentage composition of CO$_2$ in the resulting mixture as a function of repetition (at 4 bar operating pressure). It was found that the percentage composition of the final mixture remained constant for multiple cycles, thereby demonstrating the reusability of RCA 100 (FIG. 1A). FIG. 7 also shows the conductivity of water obtained from the reaction after the precipitation of CaCO$_3$. Similar conductivity is observed over five cycles as seen from the graph of FIG. 7.

FIGS. 8A and 8B illustrate the byproducts 130, including precipitated CaCO$_3$ and water, in a test tube after the first cycle compared to after the fifth cycle, thus providing visual confirmation of the reusability of RCA 100 (FIG. 1A).

Materials, systems, and methods for capturing CO$_2$ and converting the captured CO$_2$ into useful byproducts in accordance with the present disclosure are detailed above, as is the verification of these materials and methods through experimentation. Persons skilled in the art will understand that the features specifically described hereinabove and shown in the accompanying figures are non-limiting exemplary embodiments, and that the description, disclosure, and figures should be construed merely as exemplary of particular embodiments. It is to be understood, therefore, that the present disclosure is not limited to the precise embodiments described, and that various other changes and modifications may be effected by one skilled in the art without departing from the scope or spirit of the disclosure.

What is claimed is:

1. A system configured to capture CO2 and able to be washed of the captured CO2, the system comprising:
    a material, including:
        an ionic liquid configured to capture CO2 in response to exposure to a gas comprising CO2 and to a thermal energy source, wherein the ionic liquid is one of: C10MI·BF4 or C16MI·Tf2N; and
        an aerogel holding the ionic liquid therein.

2. The system according to claim 1, wherein the ionic liquid held by the aerogel has a melting point of from 30° C. to 70° C.

3. The system according to claim 1, wherein the aerogel is a graphene aerogel.

4. The system according to claim 1, wherein the material is washable by a solution to convert the captured CO2 and wash the converted, captured CO2 from the material.

5. The system according to claim 4, wherein the solution is an aqueous Ca(OH)2 solution.

6. The system according to claim 1, wherein the ionic liquid held by the aerogel is configured to undergo a phase change in response to exposure to the thermal energy source.

7. A system configured to capture CO2 and convert the captured CO2 into useful byproducts, the system comprising:
    a material, including:
        an ionic liquid configured to capture CO2 in response to exposure to a gas comprising CO2 and to a thermal energy source; and
        an aerogel holding the ionic liquid therein; and
    a washing solution, the washing solution configured to wash the captured CO2 from the material.

8. The system according to claim 7, wherein the ionic liquid held by the aerogel has a melting point of from 30° C. to 70° C.

9. The system according to claim 7, wherein the aerogel is a graphene aerogel.

10. The system according to claim 7, wherein the ionic liquid is one of: C10MI·BF4 or C16MI·Tf2N.

11. The system according to claim 7, wherein the ionic liquid held by the aerogel is a fluorinated ionic liquid.

12. The system according to claim 11, wherein the fluorinated ionic liquid is [CF3(CF2)7(CH2)3MI][(CF3-CF2S02)2N].

13. The system according to claim 7, wherein the washing solution is an aqueous Ca(OH)2 solution.

14. The system according to claim 7, wherein the ionic liquid held by the aerogel is configured to undergo a phase change in response to exposure to the thermal energy source.

15. The system according to claim 7, wherein the washing solution is configured to wash the captured CO2 from the material as filtrate that is configured to be separated into useful byproducts, wherein one of the useful byproducts is H2O.

16. A system configured to capture CO2 and able to be washed of the captured CO2, the system comprising:
    a material, including:
        a fluorinated ionic liquid configured to capture CO2 in response to exposure to a gas comprising CO2 and to a thermal energy source, wherein the fluorinated ionic liquid is [CF3(CF2)7(CH2)3MI][(CF3-CF2S02)2N]; and
        an aerogel holding the fluorinated ionic liquid therein.

17. The system according to claim 16, wherein the fluorinated ionic liquid held by the aerogel has a melting point of from 30° C. to 70° C.

18. The system according to claim 16, wherein the aerogel is a graphene aerogel.

19. The system according to claim 16, wherein the material is washable by a solution to convert the captured CO2 and wash the converted, captured CO2 from the material.

20. The system according to claim 16, wherein the fluorinated ionic liquid held by the aerogel is configured to undergo a phase change in response to exposure to the thermal energy source.

* * * * *